May 13, 1958     E. E. HESS     2,834,591

LOCKING MECHANISM FOR OSCILLATING SCALE BEAMS

Filed May 3, 1954

INVENTOR
E. E. Hess

BY *W. S. Rambo*

ATTORNEY

2,834,591
LOCKING MECHANISM FOR OSCILLATING SCALE BEAMS

Emerson Eugene Hess, Powell, Ohio

Application May 3, 1954, Serial No. 427,312

3 Claims. (Cl. 265—49)

This invention relates to weighing scales of the type employing pivotally mounted weight-receiving and balancing beams, and has particular reference to an improved locking means for retaining such scale beams secured against movement during periods when the scales are out of use.

In such scales, the weighing levers or beams have, quite commonly, associated therewith springs or other resilient flex devices for holding the levers or beams in a given neutral position of balance when the ends thereof are equally weighted. When such flex devices are employed in connection with conventional means for retaining the levers or beams against oscillation when not in active use, the retaining means serve to hold the beams or levers in positions flexing or stressing the resilient flex devices. As a result, when it is desired to use such a scale, the release of the retaining means causes the flex devices to impart oscillatory back and forth movement to the beams, so that an element of delay is introduced in the operation which persists until the beams come to rest.

Therefore, a primary object of the present invention is to provide improved means for locking or retaining a pivotally mounted, spring influenced beam or lever of a weighing scale in a neutral or balanced position in which the spring biasing the beam or lever is free from biasing stress, so that when the locking means are released from their holding engagement with an associated beam or lever, the scale mechanism will be at once ready to perform normally its weighing functions, thereby avoiding any period of delay in waiting for the beam or lever to assume a position of balance.

Another object of the invention is to provide locking means of a novel character for the pivoted levers or beams of weighing scales which, when in active holding position, will serve to eliminate stresses and tensions on lever-balance resistance means, such as springs and other torque-producing devices.

A further object of the invention is to provide a lever-locking means for weighing scales which is of a simple, positive and readily operated design and constitutes an improvement generally in locking means of this nature.

In accordance with the present invention, my improved locking means comprises a pair of pivoted frame-mounted arms relatively united by a pivoted connecting link and arranged for pivotal movement toward and away from the opposite side edges of an associated scale beam or lever in controlling oscillatory movement of the latter. In the operation of the arms, manually actuated self-locking means are provided in the form of a disk or crank turnable about a fixed frame-mounted axis and provided with an eccentrically mounted pin which is slidably receivable in an elongated guide slot or groove formed in one of said arms. In this construction, a first of said arms is adjustably and pivotally mounted on the scale frame adjacent to one end thereof and on one side of said link, while the second of said arms is adjustably and pivotally mounted on the scale frame intermediately of its ends and on the other side of said link as regards the pivot of the first arm. In association with this structure, a coil spring is provided which yields or stretches when the disk or crank is manually rotated in one direction to move said arms to a position where the outer ends thereof engage and hold the beam or lever against movement. This coil spring also stretches upon movement of the disk or crank in the opposite direction to a position to open said arms, and thus functions to hold the arms against accidental movement when the same occupy either lever-engaging or open positions.

For a further understanding of the nature, construction, operation and advantages of my improved scale beam locking mechanism, reference may now be had to the following description and the accompanying drawings.

Figure 1:
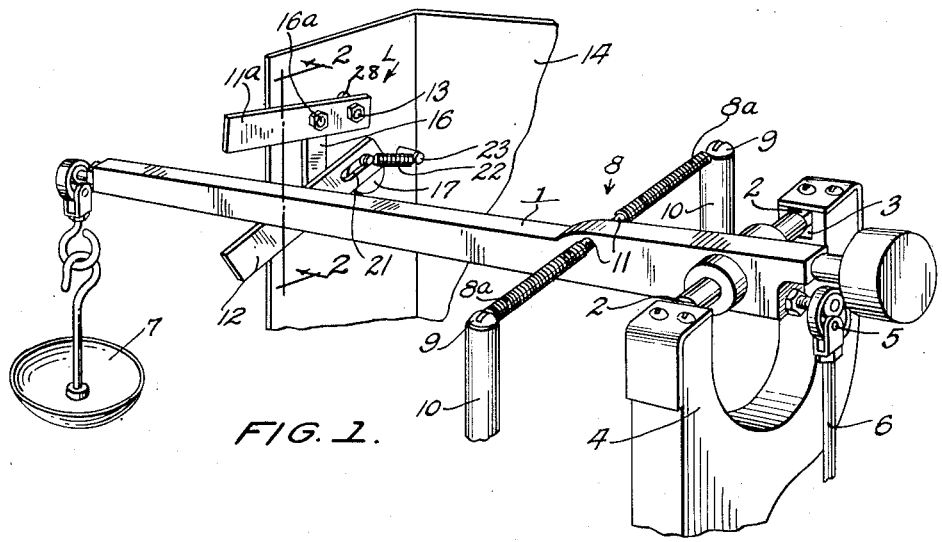
Fig. 1 is a detail perspective view disclosing a pivotally mounted beam or lever of a weighing scale and illustrating the locking or motion-restraining means therefor provided by the present invention.

Referring to the construction illustrated in the drawings by reference characters, the numeral 1 designates a conventional beam or lever of a weighing scale, the beam or lever being of the type found in inventory-type weighing and counting scales, although my invention is not limited to scales of this specific kind and may be used in any scale having a movable beam.

In this instance, the lever 1, adjacent to one end thereof, is provided with aligned transversely disposed knife edge trunnions 2 which are received in stationary bearing blocks 3 carried in a yoke 4 of a stationary scale frame. One end of the beam or lever is pivotally connected, as at 5, with the upper end of a connecting rod 6 which extends vertically downwardly from the lever for connection with a conventional movable platform or unknown weight receiver, not shown. The other end of the lever, which may be termed its outer end, carries a pivotally suspended holder 7 formed, as usual, for the reception of one or more known weights, or parts not shown, which are adapted to be applied to the holder in balancing the beam or lever 1.

As shown, the beam or lever is provided with a spring flex 8, or other equivalent torque device, for maintaining the same in a neutral or balanced position upon the application of proper weights to the ends thereof. While the spring flex may be any one of several different forms, as here illustrated, the same comprises a pair of coil springs 8a arranged transversely of the plane of the beam or lever 1 and on opposite sides of the latter. The springs have their outer ends fastened, as at 9, to stationary frame carried posts 10 and their adjoining inner ends to studs 11 projecting outwardly from the side of the beam or lever. The springs so arranged serve to hold the beam or lever in its neutral or zero position, as when the same is balanced by the application of proper weights thereto on opposite sides of its pivotal mounting 2 and 3.

To lock or retain the beam or lever 1 in its neutral or balanced position, the present invention provides the improved locking mechanism L. In the specific form thereof illustrated, the locking mechanism comprises a pair of arms; an upper arm 11a and a lower arm 12. It will be noted that these arms are arranged, respectively, above and below the outer end region of the beam or lever 1. In this instance the upper arm 11a is pivotally mounted at its inner end, as at 13, on the supporting bracket 14 of the scale frame. The lower arm is pivotally mounted at 15 intermediately of its length on the bracket 14. The two arms are pivotally linked to one another by the ends of a vertical connecting link 16, as at 16a.

Figure 2:
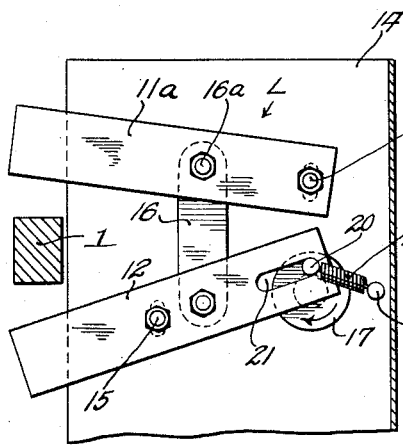
Fig. 2 is a detail transverse vertical sectional view taken on the plane indicated by the line 2—2 of Fig. 1, and disclosing the pivoted arms of the beam or lever-locking means in their open or spread apart positions admitting of normal lever or beam oscillation.
Figure 3:
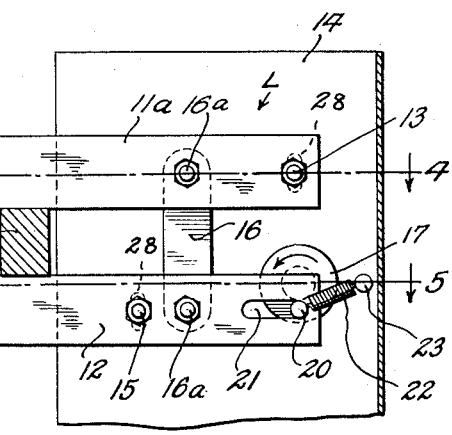
Fig. 3 is a similar view disclosing said arms in their active or closed position in which the same operate to retain the scale lever or beam against movement.
Figure 4:
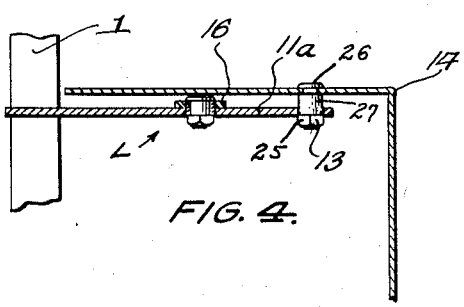
Fig. 4 is a detail horizontal sectional view taken through the upper arm of the lever-locking means on the plane indicated by the line 4—4 of Fig. 3.
Figure 5:
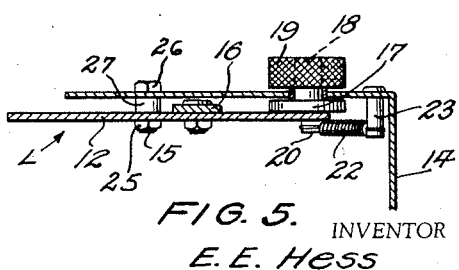
Fig. 5 is a similar view taken through the lower of the locking arms on the line 5—5 of Fig. 3.

In order to move the arms relatively between their open and closed positions, as illustrated respectively in Figs. 2 and 3 of the drawing, I preferably employ a rotatable disk or crank 17. The disk 17, as shown herein, carries a stub shaft 18 which is rotatably journaled in a bearing opening provided therefor in the bracket 14. The outer end of this shaft is equipped with an operating knob 19 by which turning movement through approximately 180 degrees may be imparted to the disk or crank.

In this instance, the disk or crank 17 is formed with a pin 20 disposed eccentrically thereon with respect to the axis of the shaft 18 and received in an elongated longitudinally extending slot or guide 21 formed, as here illustrated, in the inner end portion of the lower arm 12. Joined with the outer end of the pin 20 is the outer end of a position-maintaining coil spring 22, the inner end of this spring being fastened to a bracket-carried fastening element 23.

Thus, when it is desired to clamp or retain the lever 1 against normal oscillatory movement as produced by the application of proper weight masses to the opposite ends thereof, it is merely necessary to manually rotate the knob 18 in a direction opposite to that indicated by the arrow in Fig. 2, in order to turn the disk 17 from the position it has been shown as occupying in Fig. 2 to that of Fig. 3. In so rotating the knob 18 and the disk 17, the eccentric pin 20 will bear on the edges of the slot or guide 21 to move the inner end of the lower arm 12 downwardly and the outer end of the lower arm upwardly. The movement is continued until the outer end of the lower arm 12 is engaged with the lower longitudinally extending edge of the lever 1. Concurrent with this movement of the lower arm, the outer end of the upper arm 11a is moved downwardly into clamping and motion-arresting contact with the upper edge of the lever. This movement of the upper arm is attained through the medium of the connecting link 16 which, by having its ends pivotally united with the upper and lower arms at positions between the pivots 13 and 15, causes the outer end of the upper arm 11a to move in a direction opposite the outer end of the lower arm 12 upon unidirectional turning movement of the disk 17. It will be further noted that the spring 22 serves to hold the pin 20 positively in the extreme inner end of the slot 21 in both lever-locking and releasing positions of the arms 11a and 12, preventing accidental movement of the arms to an intermediate position.

Advantageously, the pivot points 13 and 15 of the arms are provided by nuts 25 and bolts 26 having spacer sleeves 27 therebetween, whereby the arms 11a and 12 may freely pivot without binding. Also the supporting bracket 14 may be provided with relatively elongated slots 28 to provide for limited adjustment of the pivot points 13 and 15.

The construction of my improved scale lever locking mechanism is thus simple, positive and economical, and while I have set forth in detail a single presently preferred embodiment thereof, it will be understood that the construction is subject to certain variation or modification within the scope of the following claims.

I claim:
1. Mechanism for holding a pivotally mounted weight-balancing beam of a weighing scale in a position of balance during periods of scale inactivity, comprising: upper and lower arms arranged respectively above and below such an oscillatory scale beam, means pivotally mounting the upper arm at one end thereof on an associated scale frame, means pivotally mounting the lower of said arms on said frame at a position midway of the length of said lower arm, a link pivotally connected at one end thereof with said upper arm at a position spaced outwardly from the pivotal connection of said upper arm with said frame, said link having its opposite end pivotally connected with said lower arm at a position spaced inwardly from the pivotal mounting of the lower arm on said frame, and manually operated means joined with the inner end of said lower arm and operative through the interposition of said link to impart concomitant swinging movement in opposite directions to said arms in holding and releasing the associated scale beam.

2. Mechanism for holding a pivotally mounted weight-balancing beam of a weighing scale in a position of balance during periods of scale inactivity, comprising: upper and lower arms arranged respectively above and below an associated scale beam, means pivotally mounting the upper arm at one end thereof on an assoicated scale frame; means pivotally mounting the lower of said arms on said frame at a position midway of the length of said lower arm; a link pivotally connected at one end thereof with said upper arm at a position spaced outwardly from the pivotal connection of said upper arm with said frame, said link having its opposite end pivotally connected with said lower arm at a position spaced inwardly from the pivotal mounting of the lower arm on said frame; manually operated means joined with the inner end of said lower arm and operative through the interposition of said link to impart concomitant swinging movement in opposite directions to said arms in holding and releasing an associated scale beam; said manually operated means including a manually turnable element supported by said frame, said element being provided with a pin disposed eccentrically to the axis of rotation of the element, and elongated guide means formed in said lower arm for the reception of said pin.

3. A locking mechanism for oscillatory weighing scale beams comprising a relatively stationary frame; a pair of vertically spaced upper and lower arms pivotally connected with said frame for pivotal swinging movement in a vertical plane and having outer end portions arranged to extend respectively above and below an associated weighing scale beam, one of said arms being pivoted to said frame substantially at the inner end thereof and the other of said arms being pivoted to said frame at a point intermediate the ends thereof; a connecting link pivotally connected at the respective ends thereof to said arms between the points of pivotal connection of said arms with said frame; a rotatable manually actuated crank member engaged with the arm which is pivotally connected to said frame intermediate the ends thereof, said crank member being operable upon rotation in one direction to swing the outer end portions of said arms relatively toward one another to engage and hold an associated scale beam and when rotated in the opposite direction to swing the outer end portions of said arms relatively apart to permit of free oscillation of the associated scale beam; and means for adjusting within limits the pivotal points of connection of said arms with said frame.

References Cited in the file of this patent
UNITED STATES PATENTS
1,323,387   Bagg _____ Dec. 2, 1919
1,574,073   Englen _____ Feb. 23, 1926